US008639688B2

(12) United States Patent
Staddon et al.

(10) Patent No.: US 8,639,688 B2
(45) Date of Patent: Jan. 28, 2014

(54) METHOD AND APPARATUS FOR PERFORMING CONTEXT-BASED ENTITY ASSOCIATION

(75) Inventors: Jessica N. Staddon, Redwood City, CA (US); Richard Chow, Sunnyvale, CA (US); Philippe J. P. Golle, San Francisco, CA (US); Lisa S. Purvis, Fairport, NY (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 604 days.

(21) Appl. No.: 12/617,370

(22) Filed: Nov. 12, 2009

(65) Prior Publication Data

US 2011/0113028 A1  May 12, 2011

(51) Int. Cl.
*G06F 7/00* (2006.01)
*G06F 17/30* (2006.01)

(52) U.S. Cl.
USPC .......................................... 707/723; 707/705

(58) Field of Classification Search
None
See application file for complete search history.

(56) References Cited

U.S. PATENT DOCUMENTS

| | | | |
|---|---|---|---|
| 6,266,649 B1 * | 7/2001 | Linden et al. | 705/7.29 |
| 6,489,968 B1 * | 12/2002 | Ortega et al. | 715/713 |
| 7,249,058 B2 * | 7/2007 | Kim et al. | 705/26.7 |
| 7,685,091 B2 * | 3/2010 | Boone et al. | 707/737 |
| 7,693,827 B2 * | 4/2010 | Zamir et al. | 707/999.003 |
| 7,716,199 B2 * | 5/2010 | Guha | 707/706 |
| 8,001,064 B1 * | 8/2011 | Rennison | 706/14 |
| 2004/0059708 A1 * | 3/2004 | Dean et al. | 707/1 |
| 2004/0215664 A1 * | 10/2004 | Hennings et al. | 707/104.1 |
| 2004/0249709 A1 * | 12/2004 | Donovan et al. | 705/14 |
| 2005/0021397 A1 * | 1/2005 | Cui et al. | 705/14 |
| 2005/0246391 A1 * | 11/2005 | Gross | 707/200 |
| 2006/0136385 A1 * | 6/2006 | Bobrow et al. | 707/3 |
| 2006/0242192 A1 * | 10/2006 | Musgrove et al. | 707/102 |
| 2007/0027864 A1 * | 2/2007 | Collins et al. | 707/5 |
| 2007/0038614 A1 * | 2/2007 | Guha | 707/4 |
| 2008/0071742 A1 * | 3/2008 | Yang et al. | 707/3 |
| 2008/0294624 A1 * | 11/2008 | Kanigsberg et al. | 707/5 |
| 2009/0210320 A1 * | 8/2009 | Adelman et al. | 705/27 |
| 2010/0268600 A1 * | 10/2010 | Banko et al. | 705/14.52 |

* cited by examiner

*Primary Examiner* — Wilson Lee
*Assistant Examiner* — Jessica N Le
(74) *Attorney, Agent, or Firm* — Shun Yao; Park, Vaughan, Fleming & Dowler LLP

(57) ABSTRACT

A targeted advertising system performs context-based association mining using a publicly available corpus to identify a product or brand name that, under a given context, is associated with a product or brand being marketed. The system analyzes documents within the publicly available corpus that are associated with the given context, and identifies products or brand names that have a high association to the product or brand being marketed. The system can also analyze the publicly available corpus to determine contextual information which is correlated to two or more products or brand names. This contextual information includes a set of terms that facilitates filtering the publicly available corpus into an optimal set of documents that has a high association to a desired market category or demographic.

21 Claims, 9 Drawing Sheets

METHOD AND APPARATUS FOR PERFORMING CONTEXT-BASED ENTITY ASSOCIATION

BACKGROUND

1. Field

This disclosure is generally related to data mining. More specifically, this disclosure is related to methods and apparatus for performing association mining based in part on contextual information.

2. Related Art

An advertising agency typically designs an advertising campaign so that it appeals to a particular demographic, and deploys the advertisement across media channels that are associated with the target demographic. For example, an advertisement for sporting apparel will likely be designed to appeal to young people with active lifestyles, and will likely be deployed across sports-related magazines, television channels, and/or web pages.

Some retail companies improve on targeted advertising by targeting an advertisement to an individual's current purchase history. For example, an online retail company such as Amazon.com, or a large supermarket chain, can mine its transaction database to detect correlations between seemingly disparate products. Then, when a customer selects an item to purchase, the customer can be presented with an advertisement or a coupon related to another item which has been determined to be correlated with the selected item.

Unfortunately, these retail companies need to gather a large purchase history over an extended period of time to store enough transaction information to determine a correlation to a given product. Therefore, when a new product is made available, the retail company will find it difficult to determine how it should perform targeted advertising for this new product. Furthermore, marketing firms and small retail companies oftentimes do not have access to enough transaction information to develop a high-quality targeted advertising campaign.

SUMMARY

One embodiment provides a system that performs context-based association mining using a publicly available corpus to identify a product or brand name that, under a given context, is associated with a product or brand being marketed. The system analyzes documents within the publicly available corpus that are associated with the given context, and identifies products or brand names that have a high association to the product or brand being marketed. The system can also analyze the publicly available corpus to determine contextual information which is correlated to two or more products or brand names. This contextual information includes a set of terms that facilitates filtering the publicly available corpus into an optimal set of documents that has a high association to a desired market category or demographic.

In some embodiments, the system performs association mining to determine a confidence value that indicates the strength of an association between a product advertised and a target product (e.g., a related product that competes with the product advertised) that can serve as the basis for an advertising campaign. To do so, the system first determines a first number associated with a quantity of documents that mention the product advertised, and mention contextual information associated with a predetermined context. Then, the system determines a second number associated with a second quantity of documents that also mention the target product, along with the product advertised and the predetermined context. To determine the confidence value, the system computes the ratio of the second number to the first number, thereby computing the portion of documents that mention the product advertised within a given context, that also mention the target product.

In some other embodiments, the system performs association mining to determine a confidence value that indicates the strength of an association between a product and a market category that serves as the basis for an advertising campaign. To do so, the system first determines a first number associated with a quantity of documents that mention the product, and mention contextual information associated with a predetermined context. Then, the system determines a second number associated with a second quantity of documents that also mention a market category, along with the product name and the contextual information. To determine the confidence value, the system computes the ratio of the second number to the first number, thereby computing the portion of documents that mention the product name, that also mention the market category.

The system can determine the contextual information by identifying a set of terms associated with the target market category which are not included in the predetermined context, and generating a term-combination that includes this identified set of terms and the predetermined context. For example, the system can generate a set of synonyms and hypernyms that are associated with the target market category, and can include these synonyms and hypernyms in the contextual information. Furthermore, the system can identify a set of terms in the predetermined context which have a weak association with the target market category, and can generate the contextual information without including the identified set of terms.

In some embodiments, the system can determine product identifiers for more than one target product that are related to a product advertised, and can rank these product identifiers based in part on a corresponding set of confidence values.

In some embodiments, the publicly available corpus includes the Internet. Furthermore, the system can determine the quantity of publicly available documents that mention a term by performing an Internet search query.

In some embodiments, the system can determine a set of terms that is associated with a product advertised and a target product. To do so, the system performs a first search query through the publicly available corpus to determine a first set of terms which are associated with the product advertised, and performs a second search query to determine a second set of terms which are associated with the target product. The system then determines a third set of terms which occur in the first set of terms and occur in the second set of terms.

BRIEF DESCRIPTION OF THE FIGURES

In the figures, like reference numerals refer to the same figure elements.

DETAILED DESCRIPTION

Figure 1:
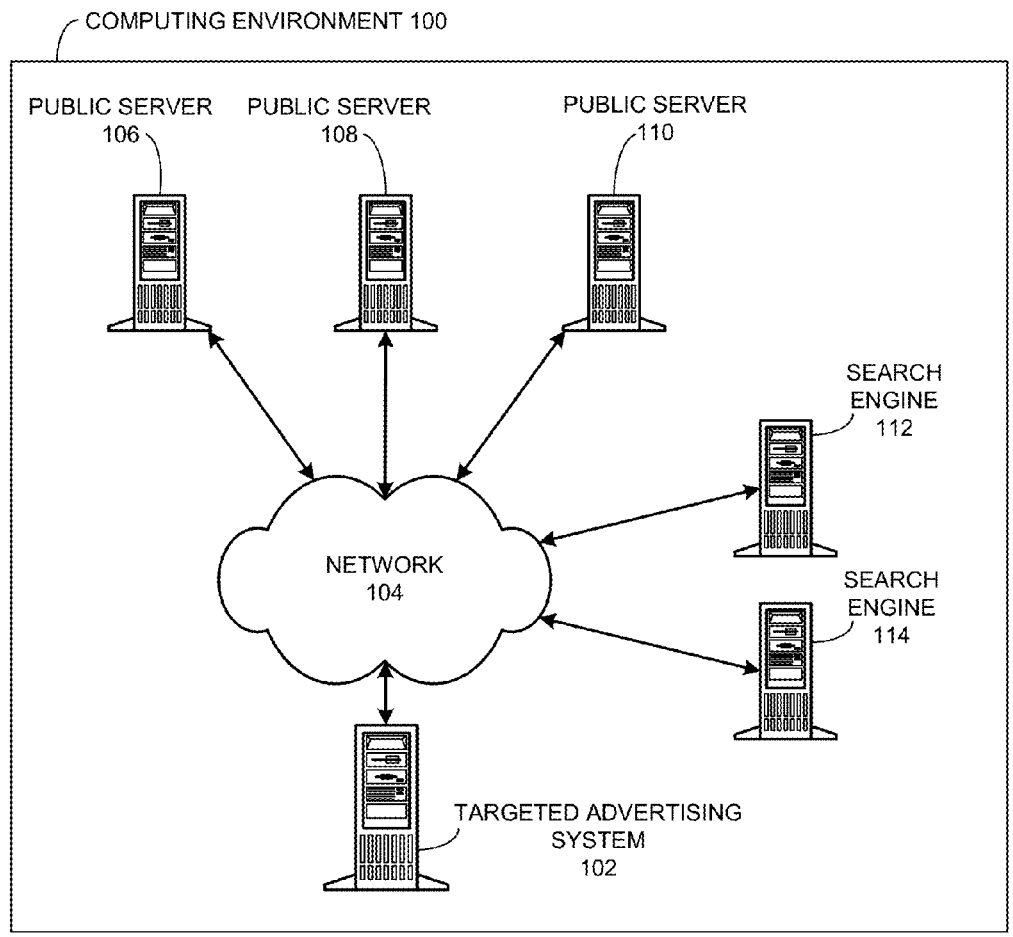
FIG. 1 illustrates an exemplary computing environment associated with an advertisement targeting system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments of the present invention provide a system that facilitates targeting an advertising campaign by exploiting product correlations that exist in publicly available documents. Association mining technologies can mine text in a large corpus (e.g., documents available via the Internet) to determine whether an association exists between two products. For example, an object B is associated with an object A (denoted A→B), if a document that mentions object A has a high probability of also mentioning object B (i.e., P(B|A) is high). The value produced by the computation P(B|A) is known as a confidence value.

Specifically, a basic approach to performing association mining can determine an association to an object A by parsing documents that are determined most relevant to object A by a search engine. A set of candidate terms B can then be ranked according to the confidence value, P(B|A). P(B|A) is estimated by taking the ratio of the number of documents in the corpus containing A and B, to the number of documents containing A. As an example, when A=HIV, this approach can be used to identify HIV medications like Enfuvirtide and Tenofovir.

Association mining as just described is both too stringent and too coarse for targeted advertising. It is too stringent because it searches for high-confidence-valued associations between terms in a large, diverse corpus. For example, a brand name may appear in a multitude of documents that span a variety of contexts. To make matters worse, many of these documents may have a context that is unrelated to the brand (e.g., the brand name is mentioned in a misplaced advertisement). Therefore, it is possible that an association between two brands will not be detected when unrelated documents are not filtered out of the association mining process.

Association mining is too coarse because it does not take into account the broader context in which advertising associations can exist for a given brand name. More specifically, basic association mining can fail to identify a correct association between two brands. Consider the brand names Reebok, Crocs and Nike. The first and third names are athletic shoe brands, while the second name is a brand of sandals. Hence, for advertising purposes, it makes more sense to suggest Rebook shoes to someone shopping for Nike shoes, than to someone shopping for Crocs. However, basic association mining discovers only a weak association between Reebok and Nike (i.e., P(Nike|Reebok)=0.02), and discovers a slightly higher association between Reebok and Crocs (i.e., P(Crocs|Reebok)=0.06). Therefore, basic association mining is likely to identify an incorrect association for a target product when appropriate contextual information is not taken into consideration.

Targeted advertising is achieved by identifying and employing the right context in which strong associations exist for a target product. For example, if association mining is performed using only documents that also mention at least one of the keywords "shoes" and "footwear" (i.e., shoes and footwear form the context), then the confidence value for Reebok→Nike is significantly larger than the confidence value for Reebok→Crocs (P(Nike|Reebok)=0.67, and P(Crocs|Reebok)=0.4). Contextual information can be obtained from a wide range of sources, including brand-related information (e.g., a brand name), as well as user-centric context, such as user preferences and activities (e.g., a browser history, a print job history, and a purchase history). Context-based targeted advertising provides techniques for identifying contextual information in which correct associations can be measured for a target product, and provides techniques for leveraging this contextual information using association mining to target an advertisement campaign.

FIG. 1 illustrates an exemplary computing environment associated with a targeted advertising system in accordance with an embodiment. Computing environment 100 includes a targeted advertising system 102, a network 104, a number of public servers 106-110, and search engines 112-114. Network 104 can include any type of wired or wireless communication channel. In one embodiment, network 104 includes the Internet, and search engines 112-114 can include Internet search engines. Furthermore, targeted advertising system 102, public servers 106-110, and search engines 112-114 can include any node with computational capability and a communication mechanism for communicating with a computing device through network 104.

Public servers 106-110 can post a number of files and documents on network 104 for public access. By doing so, public servers 106-110 allow search engines 112-114 to index the terms mentioned in their files and documents. Furthermore, public servers 106-110 can register a number of files and documents with search engines 112-114 to have their terms intentionally indexed by search engines 112-114.

Search engines 112-114 can traverse a number of files and documents made publicly accessible by public servers 106-110 to index the terms mentioned within these files and documents. Search engines 112-114 use these indexes to catalog the contents of a multitude of documents. By doing so, search engines 112-114 are able to respond to a search query by providing a listing of documents (e.g., Internet web pages, PDFs, etc.) that are associated with the terms in the search query.

Targeted advertising system 102 can take advantage of the public information provided by public servers 106-110, and indexed by search engines 112-114, to identify one or more products, services, and/or market categories which have a high association to a given marketing campaign. In some embodiments, the system performs association mining to determine a confidence value that indicates the strength of an association between a product advertised and a target product that serves as the basis for an advertising campaign. In some other embodiments, the system performs association mining to determine a confidence value that indicates the strength of an association between two competing products and a market category that serves as the basis for an advertising campaign.

Figure 2:
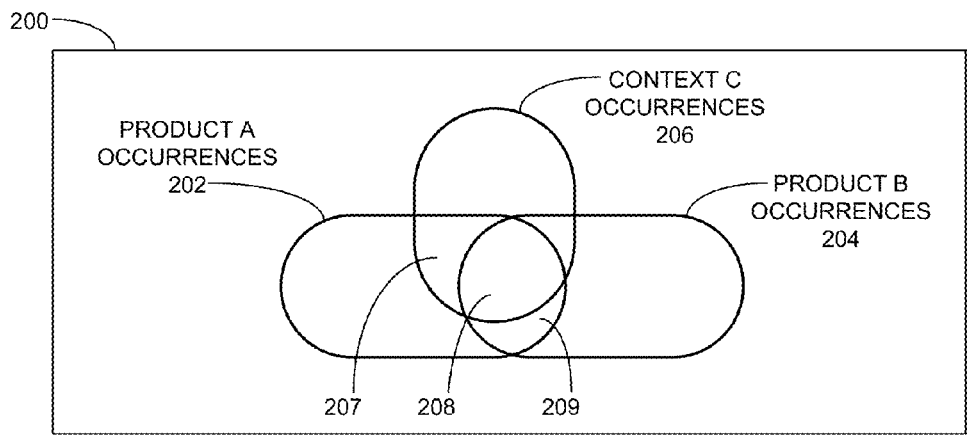
FIG. 2 presents a Venn diagram illustrating correlations between content occurrences in a publicly available corpus in accordance with an embodiment.

FIG. 2 presents a Venn diagram illustrating exemplary correlations between content occurrences in a publicly available corpus in accordance with an embodiment. Specifically, Venn diagram 200 illustrates exemplary correlations between products A and B, and a context C. Note that the number of documents that mention both product A and product B (i.e., regions 208-209 indicating an overlap for products A and B) is significantly smaller than the number of documents that mention product A (i.e., oval region 202). This illustrates that the computation $P(B|A)$ results in a low confidence value for the association $A|B$, which can make it difficult to identify an association between products A and B.

Furthermore, notice the relationship between context C and products A and B in FIG. 2. Region 206 represents occurrences for contextual information C that is known to be associated with product A. More specifically, notice that region 206 covers a substantial portion of the overlap for regions 202 and 204 (i.e., context C has a high association to documents that mention products A and B). Therefore, if context-based targeted advertising is performed using context C, the confidence value for the association $A \rightarrow B$ increases. In other words, FIG. 2 illustrates that the computation $P(B|A \cap C)$ results in a higher confidence value for the association $A \rightarrow B$ than the computation $P(B|A)$.

Figure 3:
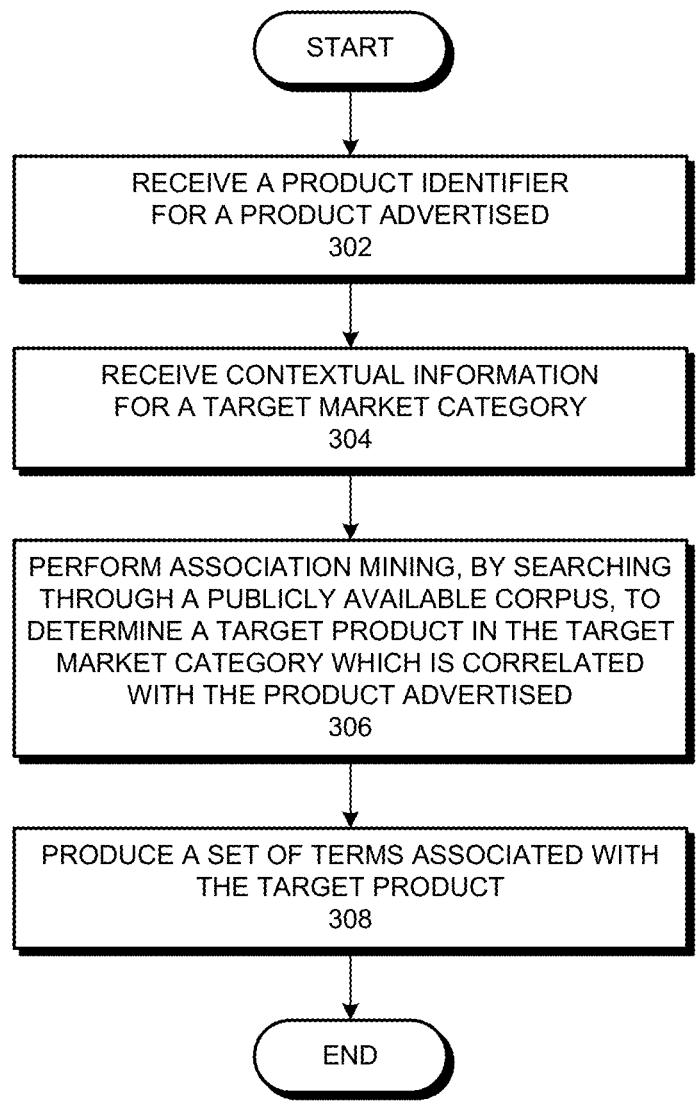
FIG. 3 presents a flow chart illustrating a process for identifying a target product in a target market category that shares a demographic profile with a product advertised in accordance with an embodiment.

FIG. 3 presents a flow chart illustrating a process for identifying a target product in a target market category that shares a demographic profile with a product advertised in accordance with an embodiment. The process can be performed on a computer system comprising a storage device that stores instructions that implement the process, and a processing unit that executes the stored instructions.

The system can begin by receiving a product identifier for a product advertised (operation 302), which can include a set of terms associated with a product or service. For example, the set of terms can include the name of the product or service, the name of its manufacturer or promotion company, the name of any person or organization affiliated with the product or service, and/or any nicknames used in reference to the product or service.

The system can also receive contextual information for a target market category (operation 304), which can include a set of terms associated with a market category or a demographic profile. For example, the set of terms can include a type of product, an adjective for a market segment (e.g., low-cost, luxury, etc.), an age group, a geographic region, a retail channel, a media channel, etc.

Next, the system performs association mining, by searching a publicly available corpus, to determine a target product in the target market category which is correlated with the product advertised (operation 306). The system then produces a set of terms associated with the target product (operation 308). In some embodiments, the system can perform operation 308 to produce the set of terms associated with the target product by generating a term-combination which includes a product identifier for the target product, and includes zero or more terms selected from the contextual information.

Figure 4:
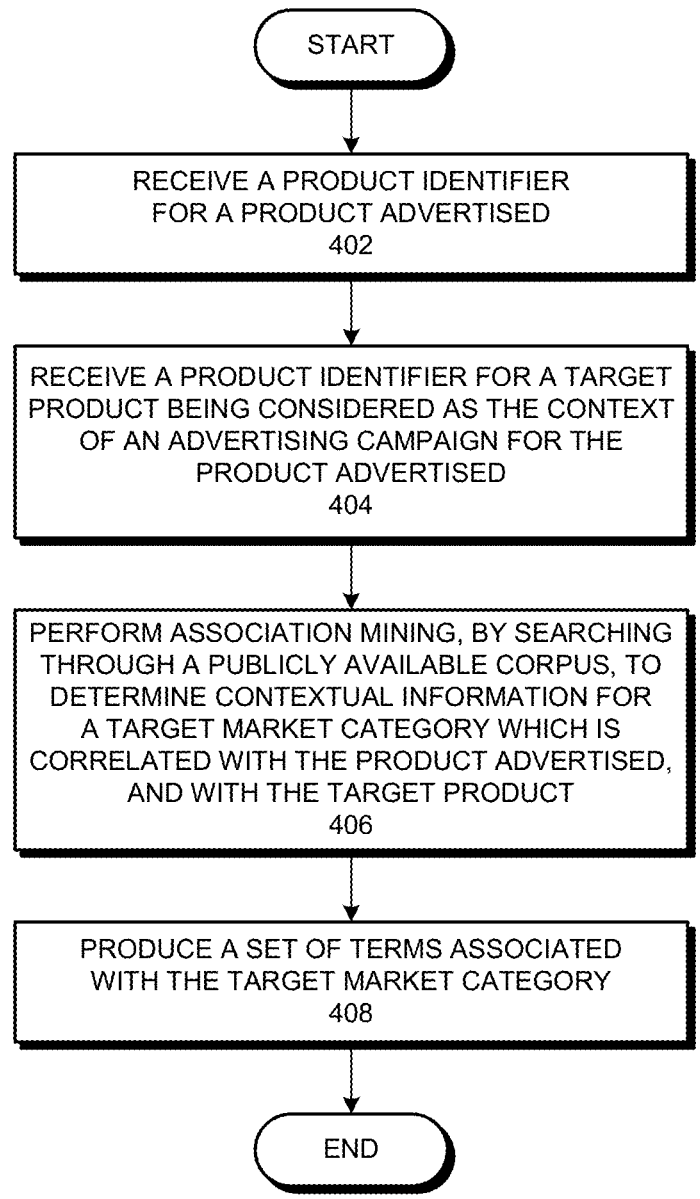
FIG. 4 presents a flow chart illustrating a process for determining contextual information which exposes a correlation between two products in accordance with an embodiment.

FIG. 4 presents a flow chart illustrating a process for determining contextual information which exposes a correlation between two products in accordance with an embodiment. The system can begin by receiving a product identifier for a product advertised (operation 402), which can include a set of terms associated with the product advertised. The system can also receive a product identifier for a target product being considered as the context of an advertising campaign for the product advertised (operation 404), such that this product identifier can include a set of terms associated with the target product (e.g., a product that competes with the product advertised).

Next, the system performs association mining, by searching through a publicly available corpus, to determine contextual information for a target market category which is correlated with both the product advertised and the target product (operation 406). The system then produces a set of terms associated with the target market category (operation 408), based in part on the contextual information from operation 406.

In some embodiments, the system can perform operation 406 by first performing a search query through the publicly available corpus to determine a first set of terms which are associated with the product advertised, and performing a second search query through the publicly available corpus to determine a second set of terms which are associated with the target product. Then, the system can determine the set of terms associated with the target market category by identifying a third set of terms which occur in both the first and second sets of terms.

Figure 5:
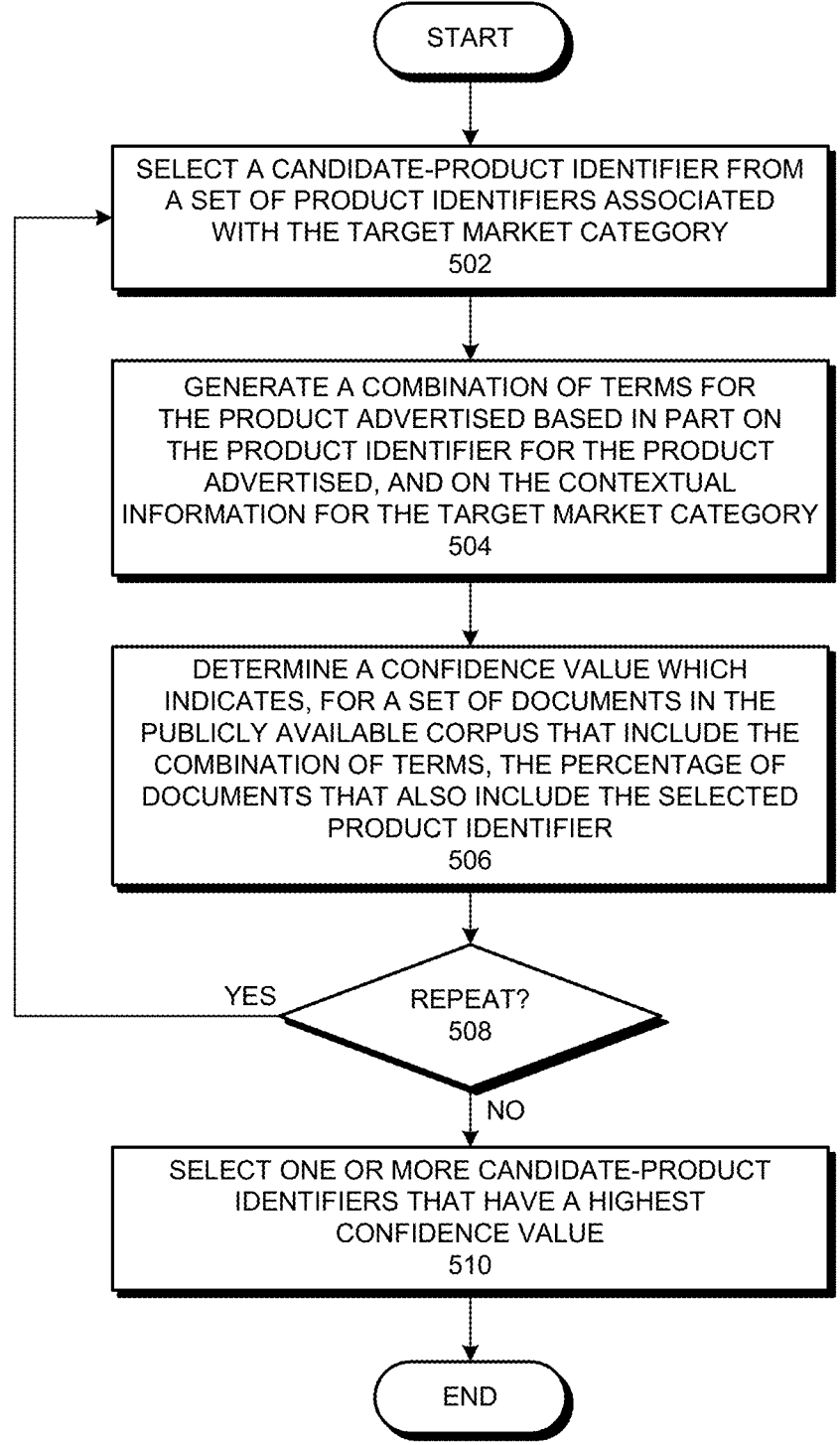
FIG. 5 presents a flow chart illustrating a process for performing association mining to select a product in a target market category which is correlated with a product advertised in accordance with an embodiment.

FIG. 5 presents a flow chart illustrating a process for performing association mining to select a product in a target market category which has a high-confidence association with a product advertised in accordance with an embodiment. In some embodiments, operations 502-510 of FIG. 5 expand upon operation 306 of FIG. 3.

The system can begin by selecting a candidate-product identifier from a set of product identifiers that are associated with the target market category (operation 502), such that the candidate-product identifier includes a set of terms associated with a product in the target market category. Next, the system can generate a term-combination for the product advertised, based in part on the candidate-product identifier for the product advertised, and on the contextual information for the target market category (operation 504). The system then determines a confidence value which indicates, for a set of documents in the publicly available corpus that include the term-combination, the percentage of documents that also include the candidate-product identifier (operation 506).

In operation 508, the system can determine whether it needs to repeat operations 502-506 to determine a confidence value for another candidate-product identifier. If so, the system returns to operation 502. Otherwise, the system selects one or more of the candidate-product identifiers that are determined to have the highest confidence values (operation 510).

Figure 6:
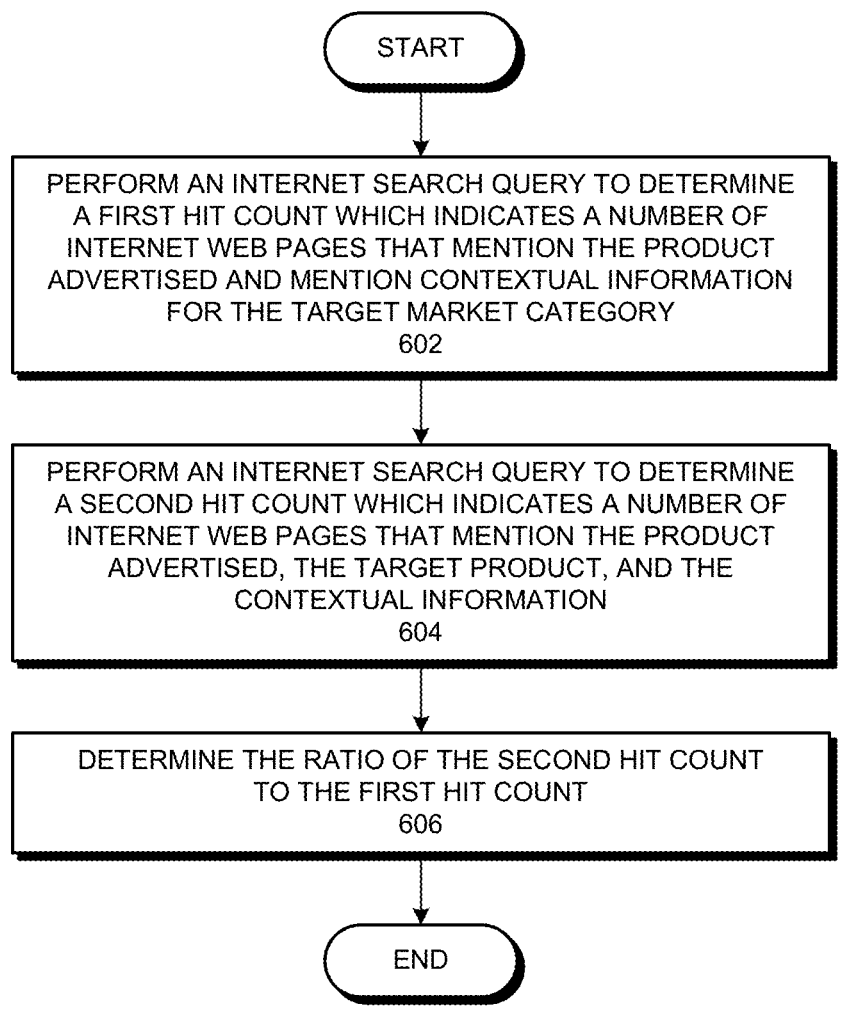
FIG. 6 presents a flow chart illustrating a process for determining a confidence value, which indicates a correlation between two products in a target market category, using Internet search queries in accordance with an embodiment.

FIG. 6 presents a flow chart illustrating a process for determining a confidence value, which indicates a correlation between two products in a target market category, using Internet search queries in accordance with an embodiment. In some embodiments, operations 602-606 of FIG. 6 expand upon operation 506 of FIG. 5.

The system can begin by performing an Internet search query, based in part on the term-combination for the product advertised, to determine a first hit count which indicates a number of Internet web pages that mention the product advertised and mention contextual information for the target market category (operation 602). Next, the system performs an Internet search query, based in part on the term-combination and the product identifier for the target product, to determine a second hit count which indicates a number of Internet web pages that mention the product advertised, the target product, and the contextual information (operation 604). The system then determines the ratio of the second hit count to the first hit count (operation 606).

Figure 7:
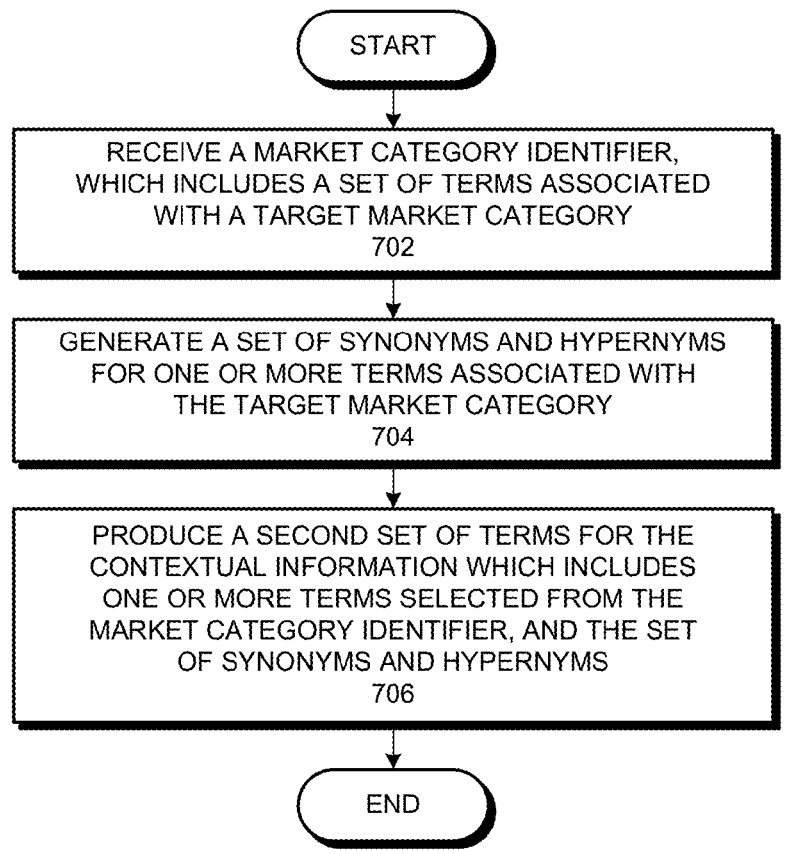
FIG. 7 presents a flow chart illustrating a process for determining contextual information associated with a target market category in accordance with an embodiment.

FIG. 7 presents a flow chart illustrating a process for determining contextual information associated with a target market category in accordance with an embodiment. In some embodiments, operations 702-706 of FIG. 7 expand upon operation 406 of FIG. 4. The system can begin by receiving a market category identifier, which includes a set of terms associated with a target market category (operation 702), and generating a set of synonyms and hypernyms for one or more terms associated with the target market category (operation 704). The system then produces a set of terms for the contextual information, which includes one or more terms selected from the market category identifier and the set of synonyms and hypernyms (operation 706).

Figure 8:
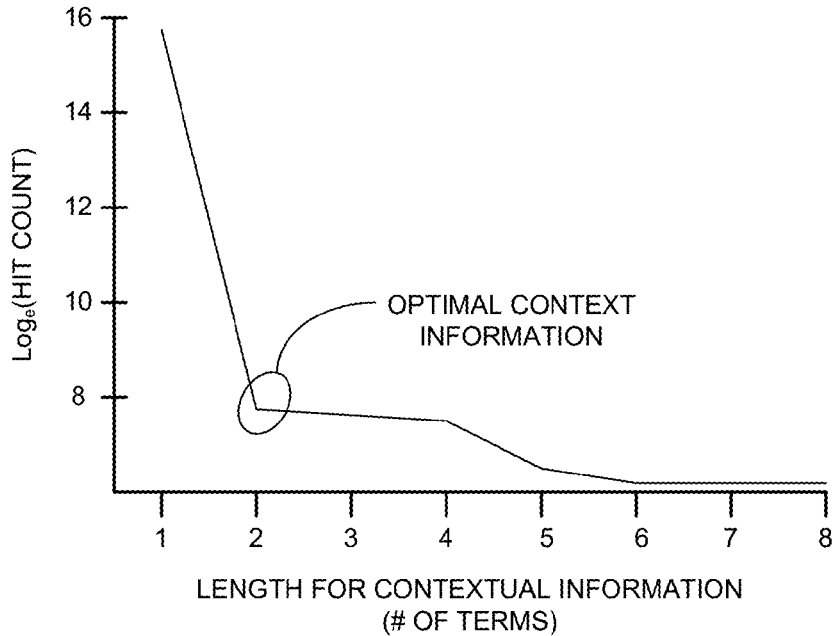
FIG. 8 illustrates a graph which plots a set of hit counts for contextual information of various lengths in accordance with an embodiment.

FIG. 8 illustrates a graph which plots a set of hit counts for contextual information of various lengths in accordance with an embodiment. Specifically, the x-coordinate for a plot point indicates the number of terms in a search query for an Internet search engine, and the y-coordinate for a plot point indicates a hit count returned for the search query (i.e., the number of pages which mention the terms in the search query).

Notice that as the number of terms increases for a search query, the hit count for the search query decreases. This is because as terms are added onto a search query, each additional term causes a set of pages to not appear in the search results because they do not mention the additional term.

Furthermore, notice that the plot includes several steep negative slopes, and several plateaus (i.e., groups of plot points with similar hit counts). A negative slope occurs when an additional term for the search query corresponds to a context that is unique from the previous terms of the search query. Conversely, a plateau occurs when an additional term for the search query corresponds to a context that has been covered by a previous term of the search query.

The presence of plateaus in the graph can be used to identify a combination of terms that best represents a context for a marketing campaign. Specifically, the plot points in the graph before the first plateau of the graph (e.g., the first plot point, at x=1 in FIG. 8) corresponds to a set of terms which under-specify the context. Note that these combinations of terms are too broad, which causes too many irrelevant documents to be included in the search results.

Conversely, the plot points in the graph after the first plateau of the graph (e.g., the last four plot points, at $x \geq 5$ in FIG. 8) correspond to a set of terms which over-specify the context. Note that these combinations of terms are too precise, which causes too many relevant documents to be filtered from the search results. Therefore, the combinations of terms associated with the first plateau (e.g., the points at $2 \leq x \leq 4$ in FIG. 8) represent a set of terms that adequately describe the context. Furthermore, because the additional terms associated with a plateau correspond to a similar context, it is sufficient to select a set of terms associated with a plot point of the plateau. Determining an ideal combination of terms for a context can be achieved by identifying the first plot point of the first plateau in the graph, and selecting the combination of terms associated with the plot point.

Figure 9:
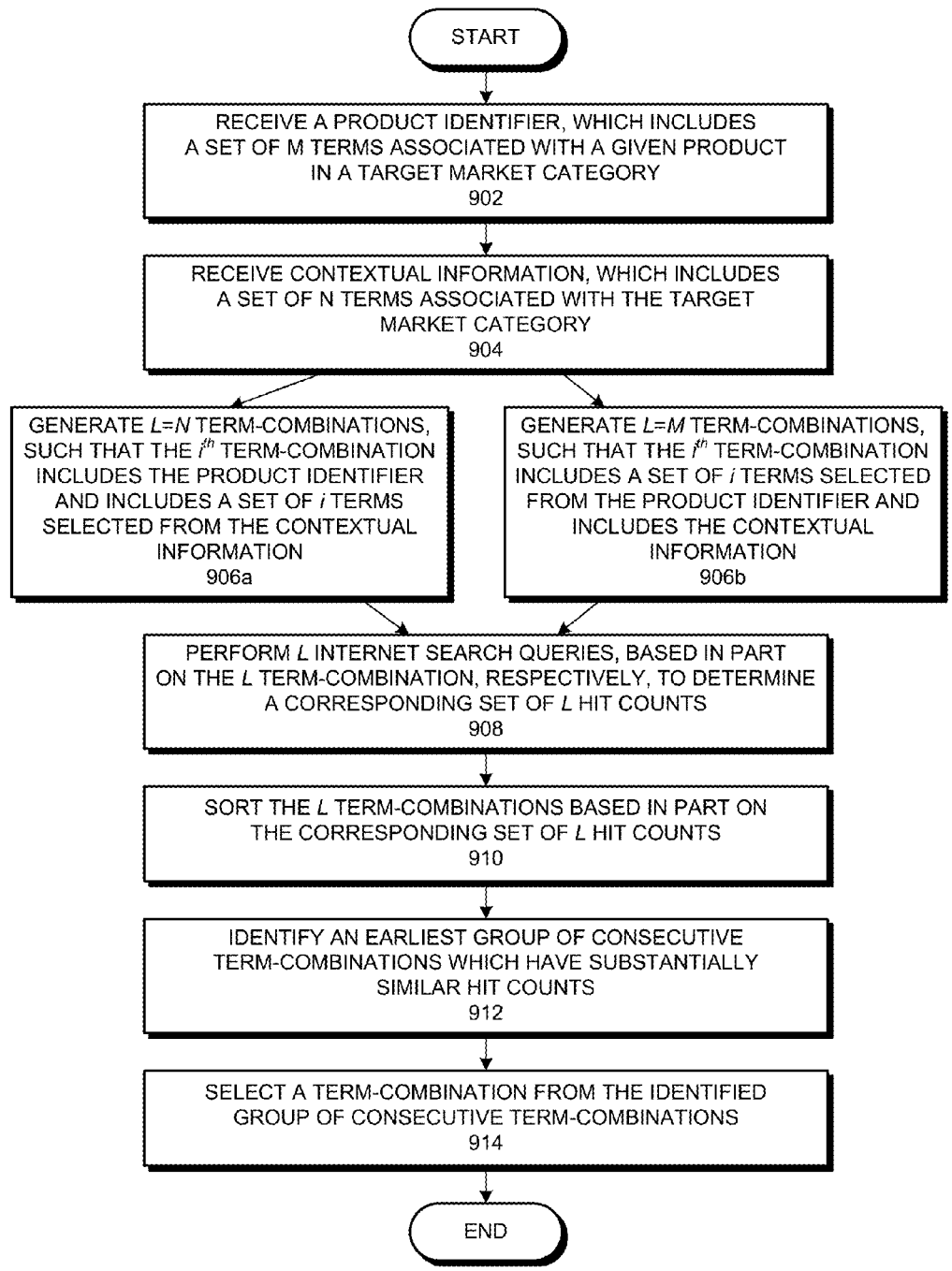
FIG. 9 presents a flow chart illustrating a process for determining an optimal set of terms to use for contextual information in accordance with an embodiment.

FIG. 9 presents a flow chart illustrating a process for determining an optimal set of terms to use for contextual information in accordance with an embodiment. In some embodiments, operations 902-914 of FIG. 9 expand upon operation 706 of FIG. 7.

The system can begin by receiving a product identifier, which includes a set of M terms associated with a given product in a target market category (operation 902), and receiving contextual information, which includes a set of N terms associated with the product and/or the target market category (operation 904). Then, in some embodiments, the system generates L=N term-combinations, such that the $i^{th}$ term-combination includes the product identifier and includes a set of i terms selected from the contextual information (operation 906a). In some other embodiments, the system generates L=M term-combinations, such that the $i^{th}$ term-combination includes a set of i terms selected from the product identifier and includes the contextual information (operation 906b). The system then performs L Internet search queries, based in part on the L term-combinations, respectively, to determine a corresponding set of L hit counts (operation 908).

Next, the system sorts the L term-combinations based in part on the L corresponding hit counts (operation 910), and analyzes the sorted set of L term-combinations to identify and select an earliest group of consecutive term-combinations which have substantially similar hit counts (operation 912). Note that two hit counts are substantially similar if their values are within an allowed difference. Furthermore, note that operations 910-912 are equivalent to generating a plot that resembles the plot in FIG. 8, and analyzing the plot to identify the earliest plateau in the plot.

Then, to determine the optimal set of terms to use for contextual information, the system selects a term-combination from the identified consecutive group of term-combinations (operation 914).

In some embodiments, the system can generate a term-combination in operation 906 by increasing the number of terms in the set of terms, thereby disambiguating the context associated with the term-combination. In doing so, the system can identify a set of terms associated with the target market category which are not included in the contextual information, and insert the identified set of terms into the term-combination. Note that increasing the number of terms in the contextual information can decrease the number of Internet web pages that are returned by an Internet search query, thereby providing a set of Internet web pages that are more closely related to the target market category. In some occasions, it is necessary to increase the number of terms in the contextual information to remove any ambiguity in its interpretation by an Internet search engine.

Conversely, the system can generate a term-combination in operation 906 by decreasing the number of terms in a set of terms, thereby under-specifying a target market category. In doing so, the system can identify a set of terms in the contextual information which have a weak association with the target market category, and remove the identified set of terms from the term-combination. For example, the set of terms in the contextual information can have a weak association with the target market category when the confidence value between these terms and the target market category is below a minimum threshold. In some occasions, it may be necessary to decrease the number of terms in the contextual information to increase the number of Internet web pages that are analyzed when a substantially small number of public documents are available for the target market category.

Figure 10:
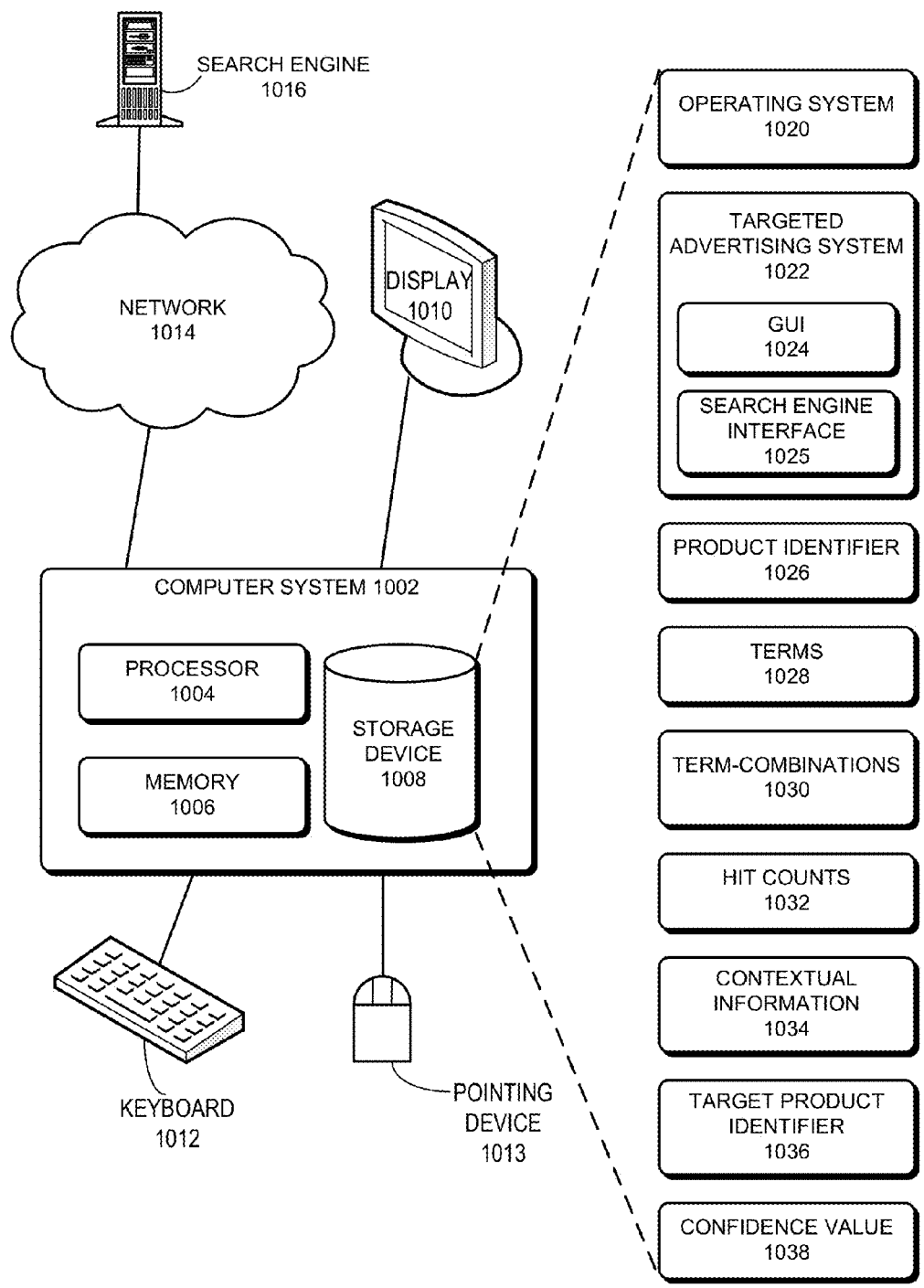
FIG. 10 illustrates an exemplary computer system that facilitates identifying a target product in a target market category that shares a demographic profile with a product advertised in accordance with an embodiment of the present invention.

FIG. 10 illustrates an exemplary computer system that facilitates identifying a target product in a target market category that shares a demographic profile with a product advertised in accordance with an embodiment of the present invention. Computer system 1002 includes a processor 1004, a memory 1006, and a storage device 1008. Furthermore, computer system 1002 can be coupled to a display device 1010, a keyboard 1012, and/or a pointing device 1013.

Storage device 1008 stores at least one of an operating system 1020, a targeted advertising system 1022, a product identifier 1026, terms 1028, term-combinations 1030, hit counts 1032, contextual information 1034, and target product identifier 1036. Furthermore, targeted advertising system 1022 can include a graphical user interface (GUI) 1024 and a search engine interface 1025.

During operation, computer system 1002 loads targeted advertising system 1022 from storage device 1008 into memory 1006, and executes targeted advertising system 1022 on processor 1004. Targeted advertising system 1022 can take advantage of public documents indexed by search engine 1016 to identify one or more products, services, and/or market categories which have a high association to a given marketing campaign. To do so, targeted advertising system 1022 can configure search engine interface 1025 to issue a search query to search engine 1016, and receive a hit count for a number of public documents that mention a given combination of terms (e.g., a product identifier and/or a market category). Targeted advertising system 1022 uses a set of hit counts 1032 to determine a confidence value 1038 that indicates the strength of an association between a product advertised and a target product, or to determine a confidence value 1038 that indicates the strength of an association between two competing products and a market category.

In some embodiments, targeted advertising system 1022 performs association mining to determine an identifier 1036 for a target product that is associated with a product advertised (i.e., a product indicated by identifier 1026) under a given context (i.e., contextual information 1034). In other embodiments, targeted advertising system 1022 performs association mining to determine contextual information 1034 for a market category that is associated with the product advertised and a target product (i.e., identifiers 1026 and 1036).

Figure 11:
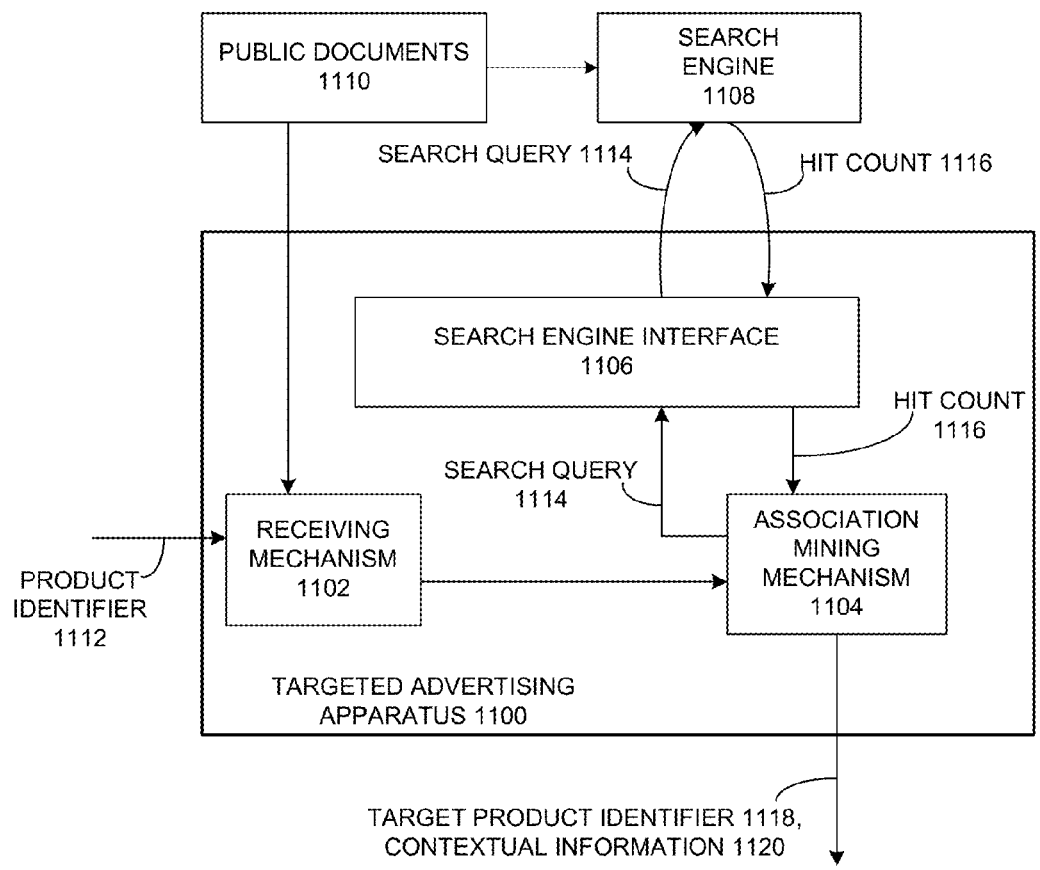
FIG. 11 illustrates an exemplary apparatus that facilitates identifying a target product in a target market category that shares a demographic profile with a product advertised in accordance with an embodiment of the present invention.

FIG. 11 illustrates an exemplary apparatus that facilitates identifying a target product in a target market category that shares a demographic profile with a product advertised in accordance with an embodiment of the present invention. Apparatus 1100 can comprise a number of mechanisms which may communicate with one another via a wired or wireless communication channel. Apparatus 1100 may be realized using one or more integrated circuits, and it may be integrated in a computer system, or it may be realized as a separate device which is capable of communicating with other computer systems and/or devices. Specifically, targeted advertising apparatus 1100 can include a receiving mechanism 1102, an association mining mechanism 1104, and a search engine interface 1106.

During operation, apparatus 1100 can take advantage of public documents 1100 indexed by search engine 1108, to identify one or more products, services, and/or market categories which have a high association to a given marketing campaign. To do so, association mining mechanism 1104 can configure search engine interface 1106 to issue a search query 1114 to search engine 1108, and receive a hit count 1116 for a number of public documents 1110 that mention a given combination of terms (e.g., a product identifier and/or a market category). Association mining mechanism 1104 uses a set of hit counts to determine a confidence value that indicates the strength of an association between a product advertised and a target product, or to determine a confidence value that indicates the strength of an association between two competing products and a market category.

In some embodiments, association mining mechanism 1104 performs association mining to determine an identifier 1118 for a target product that is associated with a product advertised. In other embodiments, association mining mechanism 1104 performs association mining to determine contextual information 1120 for a market category that is associated with the product advertised.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executed method that identifies, for an initial product to advertise, a product that is likely to be of interest to consumers of the initial product, the method comprising:
receiving a first product identifier, which includes a set of terms associated with the initial product;
determining optimized contextual information for a target market category of the initial product, wherein the optimized contextual information includes a set of terms associated with the initial product or the target market category;
performing association mining, by searching a set of documents in a publicly available corpus that mention the first product identifier and the optimized contextual information, to determine a target product that is likely to be of interest to consumers of the initial product; and in response to determining the target product by performing association mining on the set of documents, determining a confidence value for the target product using documents related to the optimized contextual information, wherein computing the confidence value involves computing a ratio of the set of documents that mention the initial product, the target product, and the optimized contextual information, to the set of documents that mention the initial product and the optimized contextual information.

2. The computer-executed method of claim 1, wherein performing association mining comprises:

selecting the second product identifier from a set of product identifiers associated with the target market category, wherein the second product identifier includes a first set of terms associated with a related product in the target market category that is likely to be of interest to consumers of the initial product;

generating a second set of terms for the initial product, which includes one or more terms selected from at least the first product identifier, and includes one or more terms selected from at least the contextual information; and determining the confidence value for the second product identifier by computing, from a set of documents in the publicly available corpus that include the second set of terms, the percentage of documents that also include the second product identifier.

3. The computer-executed method of claim 2, wherein performing association mining further comprises ranking the set of product identifiers associated with the target market category based in part on a corresponding set of confidence values.

4. The computer-executed method of claim 2, wherein the publicly available corpus includes the Internet; and wherein determining the confidence value comprises:

performing an Internet search query based in part on the second set of terms to determine a first hit count, wherein the first hit count indicates a number of Internet web pages that mention the initial product and optionally mention the target market category;

performing an Internet search query based in part on the second set of terms, the second product identifier, and the contextual information to determine a second hit count, wherein the second hit count indicates a number of Internet web pages that mention the initial product, the determined product, and optionally mention the target market category; and computing the ratio of the second hit count to the first hit count.

5. The computer-executed method of claim 2, wherein generating the second set of terms which includes the one or more terms selected from at least the contextual information comprises:

identifying one or more terms associated with the target market category which are not included in the contextual information; and inserting the identified terms into the second set of terms.

6. The computer-executed method of claim 2, wherein generating the second set of terms which includes the one or more terms selected from at least the contextual information comprises:

identifying one or more terms in the contextual information which have a weak association with the target market category; and generating the second set of terms without including the identified terms.

7. The computer-executed method of claim 2, wherein producing the first set of terms associated with the related product comprises generating a third set of terms, which includes one or more terms selected from the second product identifier, and includes zero or more terms selected from at least the contextual information.

8. The computer-executed method of claim 2, further comprising:

generating a plurality of term combinations that include contextual information;

performing an Internet search query for each term combination to determine a hit count for each term combination;

determining a group of term combinations that have substantially similar hit counts;

determining an optimized term-count for the contextual information based on the group of term combinations; and selecting a set of terms for the optimized contextual information based on the optimized term-count.

9. The computer-executed method of claim 1, wherein determining contextual information comprises:

receiving a first set of terms associated with the target market category;

generating a second set of terms which includes a set of synonyms and hypernyms for one or more terms in the first set of terms; and producing a third set of terms associated with the contextual information which includes the first set of terms and the second set of terms.

10. The computer-executed method of claim 1, further comprising receiving a second product identifier, which includes a set of terms associated with the determined product;

wherein determining contextual information comprises performing association mining to determine a third set of terms, which includes a set of keywords that are associated with the initial product and are associated with the determined product, by:

performing a first search query through the publicly available corpus to determine a first set of terms which are associated with the initial product;

performing a second search query through the publicly available corpus to determine a second set of terms which are associated with the determined product; and determining the third set of terms which occur in the first set of terms and occur in the second set of terms.

11. A computer-readable storage medium storing instructions that when executed by a computer cause the computer to perform a method, the method comprising:

receiving a first product identifier, which includes a set of terms associated with an initial product to advertise;

determining optimized contextual information for a target market category of the initial product, wherein the optimized contextual information includes a set of terms associated with the initial product or the target market category;

performing association mining, by searching a set of documents in a publicly available corpus that mention the first product identifier and the optimized contextual information, to determine a target product that is likely to be of interest to consumers of the initial product; and in response to determining the target product by performing association mining on the set of documents, determining a confidence value for the target product using documents related to the optimized contextual information, wherein computing the confidence value involves computing a percentage ratio of the set of documents that mention the initial product, the target product, and the optimized contextual information, to the set of documents that mention the initial product and the optimized contextual information.

12. The computer-readable storage medium of claim 10, wherein performing association mining comprises:

selecting the second product identifier from a set of product identifiers associated with the target market category, wherein the second product identifier includes a first set of terms associated with a related product in the target market category that is likely to be of interest to consumers of the initial product;

generating a second set of terms for the initial product, which includes one or more terms selected from at least the first product identifier, and includes one or more terms selected from at least the contextual information; and determining the confidence value for the second product identifier by computing, from a set of documents in the publicly available corpus that include the second set of terms, the percentage of documents that also include the second product identifier.

13. The computer-readable storage medium of claim 12, wherein performing association mining further comprises ranking the set of product identifiers associated with the target market category based in part on a corresponding set of confidence values.

14. The computer-readable storage medium of claim 12, wherein the publicly available corpus includes the Internet; and wherein determining the confidence value comprises:

performing an Internet search query based in part on the second set of terms to determine a first hit count, wherein the first hit count indicates a number of Internet web pages that mention the initial product and optionally mention the target market category;

performing an Internet search query based in part on the second set of terms, the second product identifier, and the contextual information to determine a second hit count, wherein the second hit count indicates a number of Internet web pages that mention the initial product, the determined product, and optionally mention the target market category; and computing the ratio of the second hit count to the first hit count.

15. The computer-readable storage medium of claim 12, wherein generating the second set of terms which includes the one or more terms selected from at least the contextual information comprises:

identifying one or more terms associated with the target market category which are not included in the contextual information; and inserting the identified terms into the second set of terms.

16. The computer-readable storage medium of claim 12, wherein generating the second set of terms which includes the one or more terms selected from at least the contextual information comprises:

identifying one or more terms in the contextual information which have a weak association with the target market category; and generating the second set of terms without including the identified terms.

17. The computer-readable storage medium of claim 12, wherein producing the first set of terms associated with the related product comprises generating a third set of terms, which includes one or more terms selected from the second product identifier, and includes zero or more terms selected from at least the contextual information.

18. The computer-readable storage medium of claim 11, wherein determining contextual information comprises:

receiving a first set of terms associated with the target market category;

generating a second set of terms which includes a set of synonyms and hypernyms for one or more terms in the first set of terms; and producing a third set of terms associated with the contextual information which includes the first set of terms and the second set of terms.

19. The computer-readable storage medium of claim 11, further comprising receiving a second product identifier, which includes a set of terms associated with the determined product;

wherein determining contextual information comprises performing association mining to determine a set of keywords, which are associated with the initial product and are associated with the determined product, by:

performing a first search query through the publicly available corpus to determine a first set of terms which are associated with the initial product;

performing a second search query through the publicly available corpus to determine a second set of terms which are associated with the determined product; and determining a third set of terms which occur in the first set of terms and occur in the second set of terms.

20. An apparatus for identifying, for an initial product to advertise, a product that is likely to be of interest to consumers of the initial product, comprising:

a processor;

a memory;

a receiving mechanism configured to receive a first product identifier, which includes a set of terms associated with the initial product; and an association mining mechanism configured to:

determine optimized contextual information for a target market category of the initial product, wherein the optimized contextual information includes a set of terms associated with the initial product or the target market category;

perform association mining, by searching a set of documents in a publicly available corpus that mention the first product identifier and the optimized contextual information, to determine a target product that is likely to be of interest to consumers of the initial product; and in response to determining the target product by performing association mining on the set of documents, determine a confidence value for the target product using documents related to the optimized contextual information, wherein computing the confidence value involves computing a ratio of the set of documents that mention the initial product, the target product, and the optimized contextual information, to the set of documents that mention the initial product and the optimized contextual information.

21. The apparatus of claim 20, wherein the association mining mechanism is further configured to perform association mining by:
- selecting the second product identifier from a set of product identifiers associated with the target market category, wherein the second product identifier includes a first set of terms associated with a related product in the target market category that is likely to be of interest to consumers of the initial product;
- generating a second set of terms for the initial product, which includes one or more terms selected from at least the first product identifier, and includes one or more terms selected from at least the contextual information; and
- determining the confidence value for the second product identifier by computing, from a set of documents in the publicly available corpus that include the second set of terms, the percentage of documents that also include the second product identifier.

\* \* \* \* \*

UNITED STATES PATENT AND TRADEMARK OFFICE
CERTIFICATE OF CORRECTION

PATENT NO. : 8,639,688 B2  
APPLICATION NO. : 12/617370  
DATED : January 28, 2014  
INVENTOR(S) : Jessica N. Staddon et al.

Page 1 of 1

It is certified that error appears in the above-identified patent and that said Letters Patent is hereby corrected as shown below:

On the Title Page, Item (73) Assignee should read: PALO ALTO RESEARCH CENTER INCORPORATED, Palo Alto, California (US) and XEROX CORPORATION, Stamford, Connecticut (US)

Signed and Sealed this  
Sixth Day of January, 2015

Michelle K. Lee  
*Deputy Director of the United States Patent and Trademark Office*